(12) United States Patent
Baxter et al.

(10) Patent No.: US 7,330,963 B2
(45) Date of Patent: Feb. 12, 2008

(54) RESOLVING ALL PREVIOUS POTENTIALLY EXCEPTING ARCHITECTURAL OPERATIONS BEFORE ISSUING STORE ARCHITECTURAL OPERATION

(75) Inventors: Jeffery J. Baxter, Los Gatos, CA (US); Gary N. Hammond, Fort Collins, CO (US); Nazar A. Zaidi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/407,183

(22) Filed: Apr. 18, 2006

(65) Prior Publication Data
US 2006/0190706 A1    Aug. 24, 2006

Related U.S. Application Data

(62) Division of application No. 10/247,894, filed on Sep. 19, 2002, now Pat. No. 7,062,636.

(51) Int. Cl.
*G06F 9/38* (2006.01)

(52) U.S. Cl. .................. 712/218; 711/141; 712/23; 712/216

(58) Field of Classification Search ............... None
See application file for complete search history.

(56) References Cited

U.S. PATENT DOCUMENTS

| | | | |
|---|---|---|---|
| 5,241,636 A | 8/1993 | Kohn | 712/215 |
| 5,623,628 A | 4/1997 | Brayton et al. | 711/141 |
| 5,659,782 A * | 8/1997 | Senter et al. | 712/23 |
| 5,721,855 A | 2/1998 | Hinton et al. | 712/218 |
| 5,751,983 A | 5/1998 | Abramson et al. | 712/216 |
| 5,848,256 A | 12/1998 | Call et al. | 712/216 |
| 6,484,254 B1 | 11/2002 | Chowdhury et al. | 712/216 |
| 6,505,293 B1 | 1/2003 | Jourdan et al. | 712/217 |

(Continued)

OTHER PUBLICATIONS

U.S. Appl. No. 11/406,879, Office Action dated Aug. 2, 2006.

(Continued)

*Primary Examiner*—Kenneth S. Kim
(74) *Attorney, Agent, or Firm*—Blakely, Sokoloff, Taylor & Zafman LLP

(57) ABSTRACT

Embodiments include various methods, apparatuses, and systems in which a processor includes an out of order issue engine and an in-order execution pipeline. For some embodiments, the issue engine may be remote from the execution pipeline and execution resources may be many clock cycles away from the issue engine. The issue engine categorizes operations as at least one of either a speculative operations, which perform computations, or an architectural operation, which has potential to fault or cause an exception. Potentially excepting operations may be decomposed into two separate micro-operations: a speculative micro-operation, which is used to generate data results speculatively so that operations dependent on the results may be speculatively issued, and an architectural micro-operation, which signals the faulting condition for the excepting operation. A STORE operation becomes an architectural operation and all previous faulting conditions may be guaranteed to have evaluated before a STORE is issued.

11 Claims, 6 Drawing Sheets

U.S. PATENT DOCUMENTS

| | | | |
|---|---|---|---|
| 6,598,156 B1 | 7/2003 | Arora | 712/244 |
| 6,618,803 B1 * | 9/2003 | Hannum et al. | 712/225 |
| 6,631,460 B1 * | 10/2003 | Morris et al. | 712/217 |
| 6,658,559 B1 | 12/2003 | Arora et al. | 712/245 |
| 6,728,867 B1 | 4/2004 | Kling | 712/216 |

OTHER PUBLICATIONS

U.S. Appl. No. 11/407,184, Office Action dated Sep. 11, 2006.

U.S. Appl. No. 11/406,879 (filed Apr. 18, 2006), Office Action, mailed Mar. 13, 2007.

* cited by examiner

RESOLVING ALL PREVIOUS POTENTIALLY EXCEPTING ARCHITECTURAL OPERATIONS BEFORE ISSUING STORE ARCHITECTURAL OPERATION

CROSS-REFERENCE TO RELATED APPLICATION

The present application is a Divisional of U.S. Ser. No. 10/247,894, filed Sep. 19, 2002 now U.S. Pat. No. 7,062,636.

FIELD OF THE INVENTION

Embodiments of the invention generally relate to the field of computer processor architecture. More one or more embodiments of the invention relate specifically, to methods and apparatus for addressing problems associated with the execution of different sets of architectural semantics.

BACKGROUND OF THE INVENTION

Due to the physical designs of processor architectures, two or more clock cycles may occur between when the issuing engine issues an operation and when the issuing engine receives feedback regarding whether that issued operation has been executed or retired. Problems can occur if a mechanism is not in place during the interim time period between the occurrence of the issuing of the operation and the feedback to the processor on the execution/retirement of that operation. For example, data corruption can occur if a first operation results in an irreversible data change or state change external to the processor and a second operation executes after the first operation but anticipated using the original data or state.

Also, the continued growth of the microprocessor industry has lead to the development of competing processor architectures. Several prior processor designs try to maintain compatibility between different machines operating according to different instruction set architectures (ISAs). However, a problems in the industry exist in designing a microprocessor architecture to provide architectural compatibility with prior sets of instructions, while introducing a new instruction set architectures such as the reduced instruction set computer (RISC) designs.

One of the difficulties in implementing such a machine is how to superimpose the older, for example, 32-bit instruction semantics on a new, 64-bit architecture having a completely different set of semantics while minimizing the use of special hardware in the execution core of the machine.

A previous processor used an additional piece of hardware called a memory order buffer to handle memory ordering semantics. The processor included an out-of-order engine wherein operations are issued to the execution core of the processor before all of the control dependencies for those operations had been resolved. These operations are known as speculative operations. In the event that a particular operation's control dependencies are resolved to be false, the results of the operation are ignored. However, some operations, such as STORE operations, cannot be performed speculatively as they update the architectural state external to the processor. This processor uses the memory order buffer to resolve this potential data corruption conflict.

For example, a STORE is not issued to the execution engine, but instead is placed into the memory order buffer to hold the STORE addresses and associated data. The STORE is then issued when all the control dependencies have been resolved for that particular operation. To provide correct data for speculative LOADs, the execute engine snoops the speculative store buffer for speculative STOREs to the LOAD address. If a match was found, data was provided from the speculative store buffer. If the Store address is unknown, the LOAD must wait until the STORE address computation result is available.

Thus, the memory order buffer is typically closely coupled with the processor. The memory complex continually receives requests and sends responses to the memory order buffer (MOB). The issue engine (e.g., for issuing instructions) also should couple with the MOB in order to indicate when a STORE is eligible for retirement, and hence, must be considered a committed STORE. The specific problem with this approach is that in an out-of-order machine handling different architectural semantics the issue engine is typically remote from the execute engine; therefore, any access of the machine's architectural state requires many clock cycles. The issue engine is thus unable to rely on architectural state or instruction results when making issuing decisions.

This problem is best illustrated by considering the problem encountered for LOAD operations. First, a determination of whether a LOAD should be blocked due to an unknown STORE address might typically require waiting 7-8 clocks after the address generation micro-operations (uops) have been issued from the issue engine. Again, this delay is due to the physical distance between the scheduling logic and the processor's execution units.

Other prior art processors add a piece of hardware to maintain a list of speculative LOAD addresses and issues STOREs non-speculatively, and in-order. If an address conflict occurs, the LOAD causes a machine flush and re-execution when it comes time for retirement.

Yet another approach is embodied in the HAL, out-of-order implementation of the SPARC™ V9 architecture. This machine sequentializes the address generation component of the memory hierarchy. The address generation component guarantees older STORE addresses are generated before any younger STORE address. Data is then forwarded between the older STOREs and the younger LOADs.

BRIEF DESCRIPTION OF THE DRAWINGS

The present embodiments of the invention will be understood more fully from the detailed description which follows and from the accompanying drawings, which, however, should not be taken to limit the invention to the specific embodiments shown, but rather are for explanation and understanding only.

DETAILED DESCRIPTION

In general, a processor having an out-of-order issue engine using two different sets of architectural semantics to insure architectural consistency is described. In the following description, numerous specific details are set forth, such as particular micro-operation sequences, pipeline stages, bit sizes, etc., in order to provide a thorough understanding the invention. Practitioners having ordinary skill in the data processing arts will understand that the embodiments of the invention may be practiced without many of these details. In other instances, well-known signals, components, and circuits have not been described in detail to avoid obscuring the embodiments of the invention.

Figure 1:
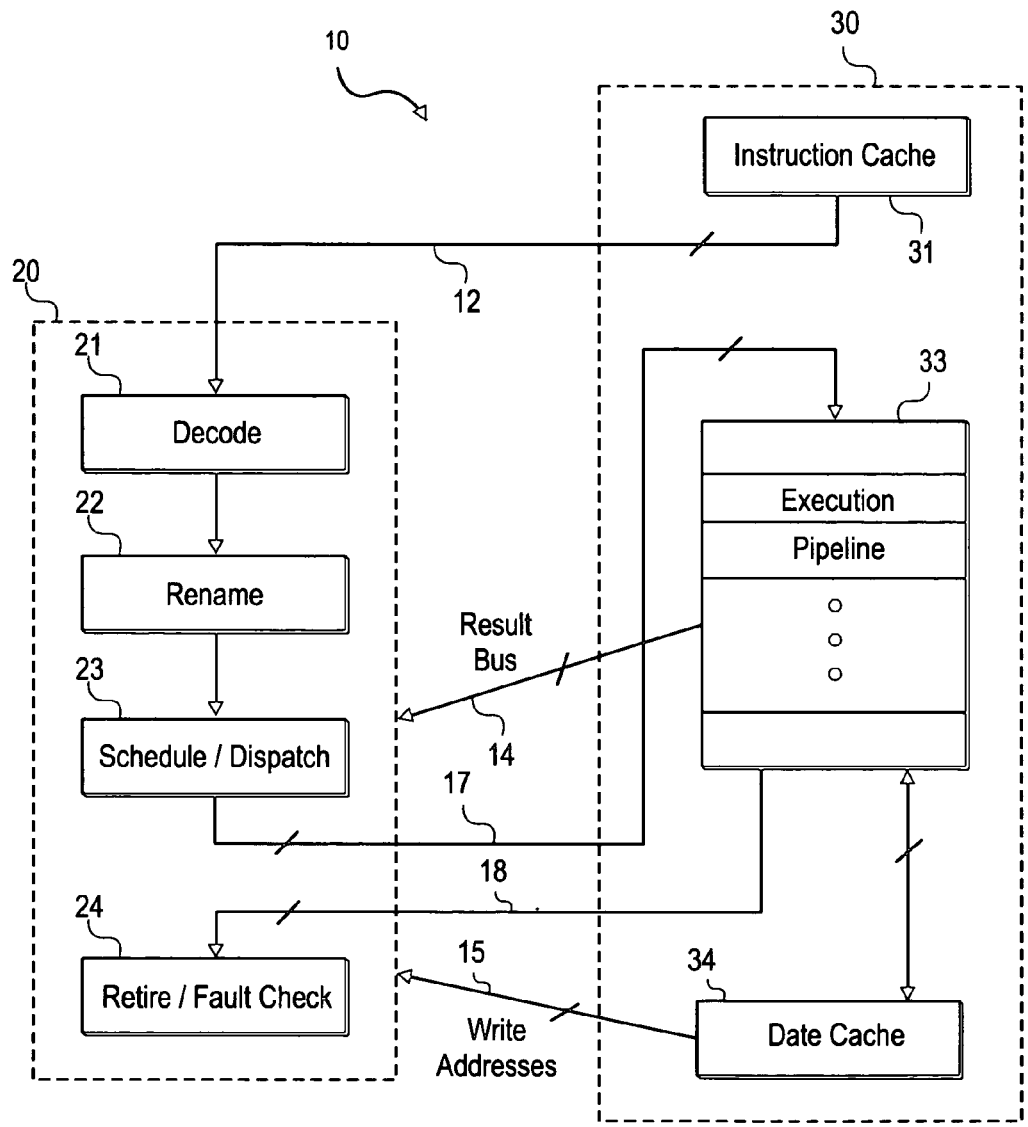
FIG. 1 illustrates a block diagram of an embodiment of a processor to process instructions having different architectural semantics.

FIG. 1 illustrates a block diagram of an embodiment of a processor to process instructions having different architectural semantics. In one embodiment, the processor 10 comprises a first engine, such as an out of order issue engine 20, which processes instructions having a first set of architectural semantics. The first engine includes a decoder unit 21 that decomposes each of the instructions into one or more micro-operations (uops). A scheduling unit 23 then dispatches the uops in an out-of-order manner. A retirement unit 24 may be also associated with the first engine 20. The out-of-order engine 20 issues speculative operations to the execution engine 30 of the processor before all of the control dependencies for those operations had been resolved.

The processor 10 further comprises a second engine, such as an execution engine 30, which processes instructions having a second set of architectural semantics. The second engine includes a data cache 34 which maintains an architectural state of the processor. The second engine also includes an in-order execution pipeline 33 which is coupled to the scheduling unit 23 of the first engine. The execution pipeline 33 executes the uops which have been dispatched by the scheduling unit 23. The results from the execution of the uops are then written into the data cache 34. In addition, the results are transmitted to the retirement unit 24 of the first engine.

Note, pipeline processing may be a category of techniques that provide simultaneous, or parallel, processing within the computer. Pipeline processing refers to overlapping operations by moving data or instructions into a conceptual pipe with all stages of the pipe processing simultaneously. For example, while one instruction is being executed, the computer is decoding the next instruction. In vector processors, several steps in a floating point operation can be processed simultaneously.

In an embodiment, the processor 10 provides architectural consistency in cases where the execution resources of the machine are many clock cycles away from the out of order issue engine 20, and where the out of order issue engine 20 cannot access the architectural state. This processor 10 may execute software that was written to run on its architecture as well as emulate another model and execute software that was written to run in the other machine.

In an embodiment, an architectural ordering model implemented in the processor 10 supports two categories of issuing semantics: speculative operations and architectural operations. Speculative operations are those that can be issued as soon as their data dependencies are satisfied but before their control dependencies are resolved. Architectural operations, on the other hand, can be issued only when all older operations in program order, such as speculative or other architectural operations, have been issued. Architectural operations include operations which cause the execution pipeline of the processor to be flushed if the operation faults.

Potentially excepting operations are decomposed into two separate uops. First, a speculative micro-operation may be used to generate the data results speculatively, so that the operations which are dependent upon the results can also be speculatively issued. This is followed by an architectural micro-operation, which signals the faulting condition for the operation. In accordance with the architectural ordering model, a STORE becomes an architectural operation, and all previous faulting conditions are guaranteed to have evaluated before the STORE is executed. However, the STORE operation can be issued speculatively before issue pipeline resolves all of the faults from operations issued earlier in program. In this way, architectural operations have no data dependencies. For pipelines having a period of many clock cycles between operation issue and execution, many operations may be being processed simultaneously. However, a STORE operation is not required to wait to issue until all of these operations execute or retire. The STORE operation may issue when all of these operations earlier in program order issue. This removes some issuing time constraints from the issue queue by allowing STORE operations to issue much quicker than in other prior methods.

Further, the processor 10 may provide significant performance benefits by reducing pressure on the retire queues of the retirement unit. Additionally, STOREs may be presented to the in-order machine faster, and therefore STOREs are passed by fewer speculative LOADs.

In an embodiment, processor 10 includes an out-of-order issue-engine such as an Intelâ architecture value engine (iVE) 20 which supports instructions written for the existing iA-32 Intelâ architecture. The primary execution engine 30 processes instructions written with differing architectural semantics for 64-bit instruction processing. Also, the execution engine 30 may be an enhanced mode (EM) engine.

It should be understood that in order to maintain compatibility with the older instruction architectures (iA) such as an iA-32 architecture, the out-of-order issue-engine 20 may be based on an out-of-order execution paradigm. Out-of-order execution implies executing an operation as soon as all resources (e.g., source operand inputs) to the operation are ready and available. This means that an out-of-order machine does not necessarily execute instructions in a traditional von-Neumann order as in the original instruction stream. For example, if an original program consisted of an in-order instruction sequence A, B, C, D, an out-of-order engine may execute this sequence as A, D, C, B. Essentially, the out-of-order engine of a processor attempts to find the longest critical path of a program and thereafter spends most of the time in this path, while other paths are evaluated in parallel. It also tries to remove artificial dependencies created by inefficiencies in programming or a given architecture, such as register shortages, control dependencies, cache misses, and other dynamic effects that limit pre-runtime compliance.

The out-of-order issue-engine 20 of processor 10 relies upon instruction cache 31 in execution engine 30 for feeding iA instructions to its issue pipeline. These iA instructions are decoded by decoder 21 which is located in out-of-order issue-engine 20. The decoding process takes each iA instruction and breaks it down into more primitive operations or steps—commonly referred to as micro-operations (uops). Renamer 22 performs well-known register renaming functions.

Following renaming, uops are fed into a scheduler where they are scheduled for dispatch to an available execution unit. Scheduling may be based on source data dependencies and execution resource availability. The scheduling and dispatch of uops operations is represented in FIG. 1 by block 23. At the end of a given scheduling phase, a packet (or bundle group) of uops is dispatched to execution engine 30, as shown by signal lines 17. In one particular embodiment up to 4 uops are dispatched to the execution pipeline 33 of execution engine 30. In one embodiment, there may be a one-to-one mapping between the uops and the instructions executed in the execution pipeline 33.

An aspect of processor 10 may be that out-of-order issue-engine 20 relies on execution engine 30 for register files, execution resources, and memory accesses through the cache and bus complex. For example, FIG. 1 shows execution pipeline 33 being directly coupled to data cache 34, which provides write addresses back to out-of-order issue-engine 20 via signal lines 15. In addition, execution pipeline 33 provides results to out-of-order issue-engine 20 via a result bus 14. Signal lines 18 also provide execution results from pipeline 33 directly to the retirement/fault check unit 24 of out-of-order issue-engine 20.

Once a particular operation has been completed, out-of-order issue-engine 20 records this information and updates its data structures at the retirement phase. It should be understood that out-of-order issue-engine 20 does not maintain data. Instead, it controls manipulation of data which physically resides in execution engine 30. This manipulation of data may occur either by tracking, or monitoring, or other data processing operations.

Another aspect of processor 10 may be that execution engine 30 executes instructions in-order. This means that execution engine 30 relies on the software writer/compiler to perform necessary code scheduling in accordance with the instruction set architecture of the execution engine 30. On the other hand, out-of-order issue-engine 20 performs code scheduling dynamically at run time to extract as much performance as possible. This run time optimization occurs for iA code, as most of the code which already exists cannot be recompiled. Thus, the out-of-order issue-engine scheduler logic may be responsible for analyzing data dependencies of operations and dispatching them to execution engine execution pipeline 33 based on operating execution unit availability.

Due to the inevitability of branches and exceptions, out-of-order issue-engine 20 may schedule operations such that no system state is affected by rescheduled operations which cannot be rolled back when an exception/branch is taken on an earlier operation in program order. This condition is illustrated in FIG. 2.

Figure 2:
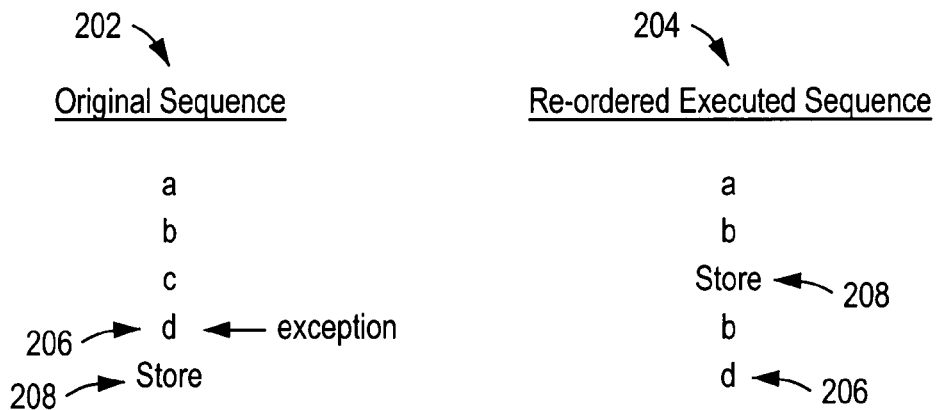
FIG. 2 illustrates an exemplary original code sequence and a re-ordered executed sequence code sequence that demonstrates out-of-order scheduling constraints in a processor that executes instructions having different architectural semantics.

FIG. 2 illustrates an exemplary original code sequence and a re-ordered executed sequence code sequence that demonstrates out-of-order scheduling constraints in a processor that executes instructions having different architectural semantics. FIG. 2 shows an original code sequence 202 and a re-ordered executed sequence 204. Note that instruction D 206 in the original program sequence 202 generates an exception. If instructions were executed in strict von-Neumann order, the STORE operation 208 following instruction D 206 would not be issued to the memory subsystem, as exception processing would begin at instruction D. However, once the instructions have been re-ordered in execution sequence 204, (as shown in the right-hand column of FIG. 2), the memory could be altered by the STORE operation when it should not be altered. The reason why is because instruction D 206 is executed later in execution order in the re-ordered sequence. The processor uses a constraint scheduling algorithm called "architectural order issue" to prevent the memory from being altered by the STORE operation 208 when it should not be altered. In an embodiment, an architectural operation checks that the exception, such as a load operation, has been executed or retired prior to executing the issued store operation 208 if an address of a speculatively issued exception operation 206 overlaps with an address of a store operation 208 issued later in program order than the exception operation 206.

The processor implements an architectural ordering model in which the issue agent of out-of-order issue-engine 20 supports two different issuing semantics. These semantics results in operations being categorized in two different ways: either as speculative operations or as architectural operations.

Speculative operations are operations that can be issued as soon as their data dependencies are satisfied and before their control dependencies are satisfied. Speculative operations execute whenever their data is ready (e.g., source operands have been computed). For this category, an ordinary re-order buffer (ROB) may be utilized to place execution results in proper execution order. In addition, the ROB may be used to generate faults, if necessary.

Architectural operations issue when all older operations in program order—either speculative or architectural—have been issued. Thus, an architectural operation may be basically any instruction that can fault. These operations are constrained to execute in the original program order. Thus, architectural operations generate no data dependencies. To put it another way, architectural operations do not produce any data for a computation. Architectural operations can and will flush the pipeline if the operation faults. In this way, architectural operations maintain proper processor state in the case of exceptions.

Practitioners familiar with computer architecture will appreciate that in the absence of a memory order buffer, if the processor were to not release STORE operations until retirement, out of necessity, LOAD operations would also have to be blocked. The reason why may be because there would be no way to determine whether data associated with a particular LOAD operation is valid. In other words, functionality could not be guaranteed.

In accordance with an embodiment of the architectural ordering model, potentially expecting operations 306 are decomposed into two separate uops. A speculative uop may be used to generate data results speculatively, so that the operations dependent upon its results can be likewise speculatively issued. In the instruction stream this may be followed by an architectural micro-operation 307, which signals the faulting condition for the operation. A STORE operation 208 becomes an architectural operation in the processor, and all previous faulting conditions are guaranteed to have been evaluated before the STORE is issued.

Note that the architectural model deals with the issuing semantics. Because the execution pipeline is in-order, all operations that have been issued to the execution pipeline are evaluated in-order. In the issue domain, however, the concept of architectural ordering guarantees that all faults are resolved before STORE hits occur.

To reiterate, architectural operations produce no data, but merely signal the presence of faults, and are utilized to flush the pipeline. Those of ordinary skill in the art will appreciate that this allows the release of STORE operations 208 at issue time in out-of-order issue-engine 20. One of the consequences of the concept of architectural ordering in the processor may be that there are two different instruction streams coming out of the scheduler: speculative operations, (which perform all of the computations) and architectural operations (which both resolve faults and basically issue STOREs).

The architectural ordering model thus provides consistent LOAD/STORE behavior and scheduling without the drawbacks associated with having additional components such as a memory ordering buffer. Some of the advantages of architectural ordering may be as follows. Whereas previous architectures have deferred the execution of STORE operations 208 until retirement (i.e., resolution of all control dependencies), in the invented processor, architectural operations, such as a store operation 208, are issued as soon as all previous operations in program order have been issued, but not necessarily evaluated. This means that the out of order issue engine may be effectively de-coupled from the retirement engine. If the execute engine is multiple clock cycles from the issue engine, multiple unevaluated architectural operations can still remain in the pipeline. Those of ordinary skill will appreciate that this provides important performance benefits.

One benefit of architectural ordering may be that it reduces pressure on the retirement and issue queues. If STORE operations 208 were deferred until retirement, large delays would develop between issue time and retirement time (due to the long latencies associated with the execution engine). This would mean that the retirement pointer typically would have to wait until an operation has fully passed through the execution pipeline before it could be advanced. In the situation where two STORE operations 208 occurred consecutively, the issue pointer for the second STORE might be more than two times the length of the execution pipeline from the retirement pointer. Of course, this distance increases linearly with the number of consecutive STOREs being executed.

A second performance advantage that an embodiment of the processor 10 provides is that STORE operations 208 are presented to the in-order portion (execution engine 30) faster; therefore the STORE operations 208 are passed by fewer speculative LOADs. This is because the in-order portion of processor 10 does not support speculative STOREs. In other words, no forwarding is available for speculative LOADs that wish to use the STORE operation's 208 contents. When a STORE is made visible to the in-order execution portion of the machine, the overlapping addresses of speculative LOADs simply create faults. In an embodiment, the overlapping addresses of speculative loads create faults through the mechanism of advanced LOADs, discussed below. Because the out of issue engine does not need to rely upon architectural data, speculative LOADs and STOREs may be issued without performing address comparisons.

Figure 3:
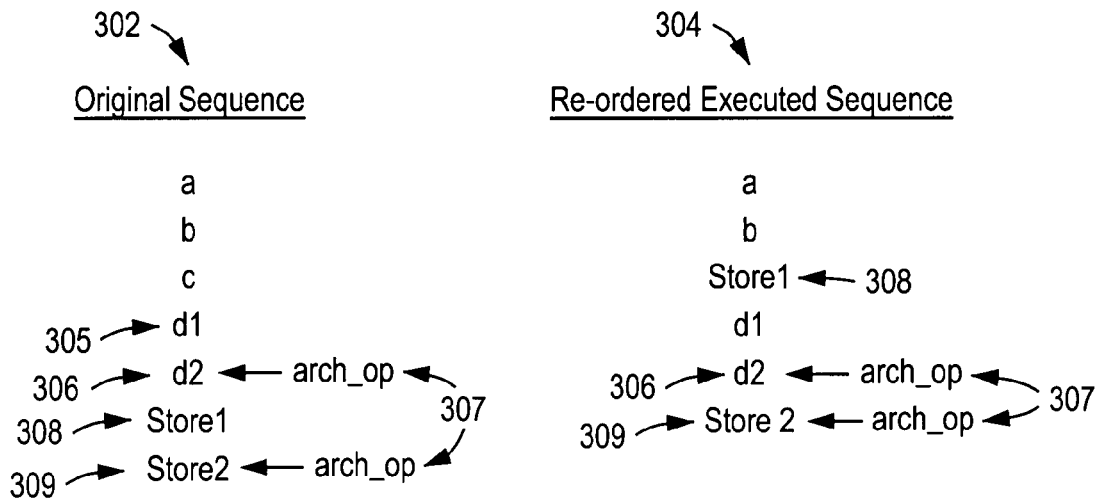
FIG. 3 illustrates the exemplary original code sequence and a re-ordered executed sequence code sequence that shows instruction issue with architectural ordering according to one embodiment of the invention.

FIG. 3 illustrates the exemplary original code sequence and a re-ordered executed sequence code sequence that shows instruction issue with architectural ordering according to one embodiment of the invention. FIG. 3 shows an original code sequence 302 and a re-ordered executed sequence 304 similar to those in FIG. 2. In this example, instruction D1 305 and D2 306 may represent the two micro-operations of instruction D 206. Similarly STORE1 308 and STORE2 309 may represent the two micro-operations of the STORE operation 206 previously discussed in connection with FIG. 2.

The processor issues STORE operations 308 309 to memory when every preceding operation in program order has successfully completed. Therefore, the architectural order issue model relies upon two separate issuing semantics. All potentially faulting (i.e., LOAD/STORE) and control (i.e., branch) instructions have an associated architectural operation, referred to as an "arch_op" 307. Updates which cannot be rolled back are a side effect of arch_ops 307. These include, for example, a STORE issued to memory operation.

Secondly, arch_ops 307 are issued when all older operations in program order (older instructions and older uops for a current instruction) have been issued. As mentioned above, arch_ops 307 are issued in strict program order with respect to one another. In an embodiment, only one arch_op 307 may be issued per clock cycle of the processor. The execution engine 30 of processor 10 flushes the execution pipeline 33, when an arch_op 307 with a fault is executed or a mis-predicted branch is encountered in the program). Execution pipeline 33 signals out-of-order issue-engine 20 when this happens.

It should be understood that instruction issuance with architectural ordering means that uops D2 306, STORE2 309, and arch_op 307, are issued in strict program order. Note that, in this example, even though STORE1 308 is issued earlier, it does not change or alter memory. However, the STORE1 308 uop does allow for address computation to be performed as early as possible.

Continuing with the example, when uop D2 306 is executed in the execution pipeline it flushes the pipeline, which also results in eliminating the STORE2 306 uop. In this example, uop D2 306 may represent a mis-predicted branch or a faulting instruction.

In an embodiment, one benefit of restricting the processor to issuing one arch_op 307 per clock cycle is that it simplifies scheduling in out-of-order issue-engine 20, as it does not impact performance. Note that the execution engine portion of processor 10 resolves more than one arch_op 307 in a bundle group according to a fixed order. For example, the fixed order may be left to right.

Figure 4:
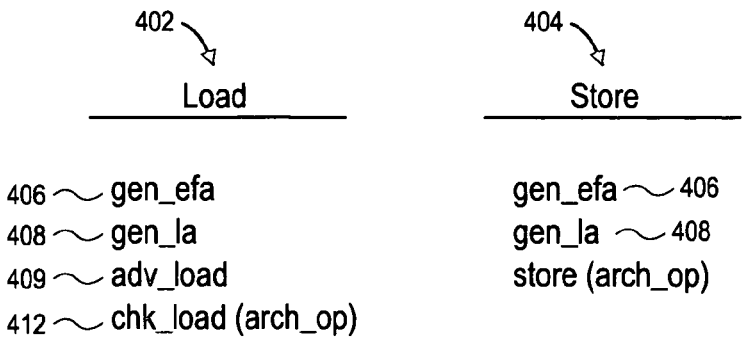
FIG. 4 illustrates an exemplary LOAD/STORE operation and the associated micro-operations for one embodiment of the processor.

FIG. 4 illustrates an exemplary LOAD/STORE operation and the associated micro-operations for one embodiment of the processor. Since instruction architectures offer several addressing modes, the memory access mechanism in the processor 10 requires one or more computations before a LOAD/STORE can be issued to the memory subsystem. This means that each LOAD/STORE operation in an architectural instruction, such as the iA 32 architecture, is broken down into several micro-operations, each of these micro-operations are then sent individually to execution pipeline 33 for execution. FIG. 4 shows the associated uops which comprise an LOAD/STORE operation. The following discussion explains the function of each uop in an embodiment for both the LOAD operation 402 and STORE operations 404.

The gen_efa uop 406 and gen_la uop 408 generate effective and linear addresses, respectively. The gen_efa uop 406 may not always be needed as gen_la uop 408 can create linear addresses directly for all addressing modes in the architectural instructions except base+index+displacement and base+index modes. The adv_load uop 409 is an advanced LOAD operation which is performed speculatively. Essentially, the idea of an advanced LOAD 409 is to start the LOAD operation as early as possible, giving it as much time as possible to complete before any instructions which are dependent upon the LOAD are encountered. As explained earlier, STORE operations traditionally have been a barrier as to how far ahead a LOAD instruction could be moved. The reason why is because compilers often cannot determine if a LOAD and a STORE instruction possibly conflict, in which case they may be reading and writing data from the same memory location. The adv_load uop 409 allows the LOAD operation to pass in execution order the STORE, which allows greater parallelism.

The chk_load uop 412 may be a check LOAD operation that verifies if any intervening STORE happens to update any one of the bytes accessed by the associated LOAD. Note that all of the LOAD uops shown in FIG. 4 may be issued speculatively, except for chk_load, as it is an arch_op type of operation.

When an advanced LOAD is executed in pipeline 33, it may be logged into a structure known as an advanced load address table (ALAT).

Figure 5:
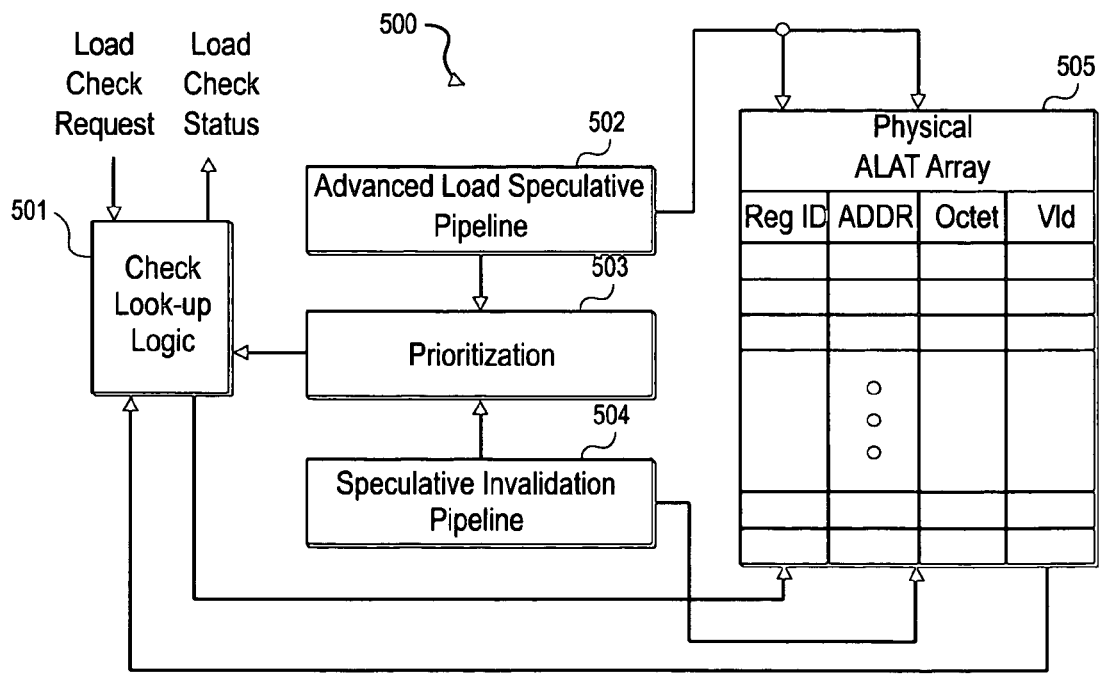
FIG. 5 illustrates a high-level architectural diagram illustrating the Advanced LOAD Address Table utilized in one embodiment of the processor.

FIG. 5 illustrates a high-level architectural diagram illustrating the Advanced LOAD Address Table utilized in one embodiment of the processor. In an embodiment, the ALAT 500 has five basic sub-components. First, an advanced load speculative pipeline 502 keeps track of the register ID and address of all of the speculative advanced LOAD operations. It should be understood that an advanced LOAD is considered speculative until the outcome of all prior branches and exceptions are known. In the processor, an advanced LOAD remains speculative until it reaches the WRB pipestage.

The physical ALAT array 505 shown in FIG. 5 comprises a plurality of entries, each having four different fields. In one embodiment, ALAT 505 has 32 entries, organized in a two-way, set-associative form. The first field is the unique register ID of the register targeted by the advanced LOAD. The tag is used to perform a lookup into ALAT 500 when the LOAD is later checked. The next field holds some subset of the entire address of the advanced LOAD. In one implementation, bits 4-19 are held in the address (ADDR) field. This address subset is used to compare with later STOREs, in order to determine if a match occurs. Also included in the physical ALAT array is an Octet field, which keeps track of the bytes within the line that are being written. Finally, a Valid bit field is included to indicate whether an entry is valid or not. The Valid bit is set when a new ALAT entry is allocated, and is cleared if a later non-speculative matching STORE is encountered in the program. Note that an entry may also be explicitly invalidated via some type of instruction, such as the check LOAD instruction.

The speculative invalidation pipeline 504 keeps track of events and instructions that invalidate ALAT entries until they are non-speculative. In some cases, the comparison is made on fewer bits, in order to facilitate a high frequency pipeline. Prioritization logic block 503 prioritizes between the advanced LOADs, STOREs, and invalidations that are in the pipeline. According to the prioritization scheme, earlier instructions take precedence over later instructions.

The last basic sub-component of ALAT 500 is the check look-up logic 501, which responds to check requests being made. Logic Block 501 queries both the physical ALAT array 505 (for non-speculative accesses) and prioritization logic block 503 (for speculative accesses), using the register ID as the tag for the request. It reports information from the prioritization logic over information from the physical ALAT array, if both happen to respond.

Thus, ALAT 500 is basically a sixteen-deep, first-in-first-out (FIFO) stack that remembers linear addresses and destination register identifiers for the last sixteen advanced LOAD uops. When the ALAT is full, the oldest entry is discarded. For any LOAD that has been potentially boosted above an intervening STORE or STOREs, it is important to know if any one of the intervening STOREs overlap the address for the LOAD. One of the functions of ALAT 500 is to keep track of this information.

When a chk_load operation is encountered, ALAT 500 indicates that an earlier STORE did overlap with the address of the associated LOAD. In such an instance the original LOAD is re-executed to obtain the most recent data. The pipelines of both execution engine 30 and out-of-order issue-engine 20 are also flushed, and the instruction stream restarted from the instruction immediately following the LOAD. This is necessary as the data consumers of adv_load may have received incorrect data. Note that reissuing of the subsequent instructions (after the LOAD) requires flushing the pipeline of out-of-order issue-engine 20 to re-create dependency information.

Referring again to FIG. 5, it can be seen that STORE operations use the same gen_efa and gen_la uops as do LOADs. These uops are allowed to be reordered as much as possible so that the actual STORE does not have to wait for address resolution. The "store" uop shown in FIG. 5 is an architectural uop, and is issued in strict program order. A request is generated in execution engine 30 of the processor for performing a memory update when the store hits the execution stage. The store uop also interrogates ALAT 500 for possible collision with LOADs which may have been advanced passed this particular STORE.

Figure 6:
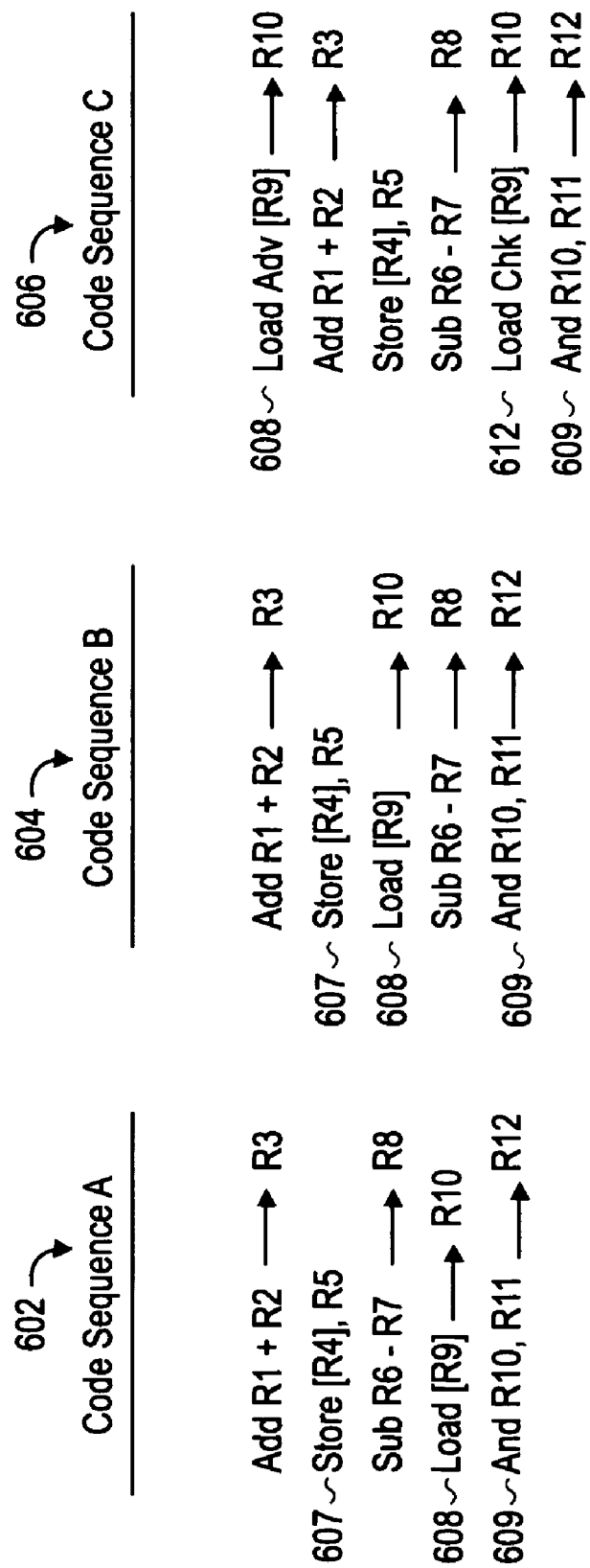
FIG. 6 illustrates various exemplary code sequences of the processor processing advanced LOAD sequences.

FIG. 6 illustrates various exemplary code sequences of the processor processing advanced LOAD sequences. FIG. 6 illustrates how advanced LOADs are utilized in one embodiment of the processor. In FIG. 6, code sequence A 602 represents an non-optimal sequence of instructions. In this sequence, the LOAD 608 and its dependent AND instruction 609 are separated by a single clock cycle. Therefore, if the LOAD operation 608 has a latency which is longer than one clock, a hazard occurs and the processor will need to defer execution of the AND instruction 609 and possibly all later instructions.

Code sequence B 604 represents a traditional approach to optimizing code sequence A 602. This optimization may be implemented for example, by a compiler moving the LOAD operation 608 as far ahead in the code as possible. Note that in code sequence B 604, the LOAD 608 is two clocks away from the dependant AND operation 609. However, unless the compiler can determine that R9 (the exemplary address of the LOAD 608) and R4 (the exemplary address of the earlier STORE operation 607) refer to different memory address, it is not permitted to move the LOAD 608 pass the STORE 607. The reason why is because if the LOAD 608 and STORE 607 are to the same address, the LOAD 608 needs to obtain the data form the STORE 607. This requirement is violated if the LOAD 608 is earlier in the program order.

Code sequence C 606 represents how the processor allows the LOAD 608 operation to be boosted past the STORE 607. This type of passing is permitted as long as a later check LOAD (ld.c) instruction 612 is used to make sure that a dependency problem does not exist. If the LOAD check 612 fails, the LOAD 608 needs to be transparently re-performed, and the dependent instructions 609 should observe the dependency. In an embodiment, in order to accommodate high performance in a superscalar implementation, the check LOAD instruction 612 has virtually no affect on the architectural state of the processor assuming that the check succeeds.

Figure 7:
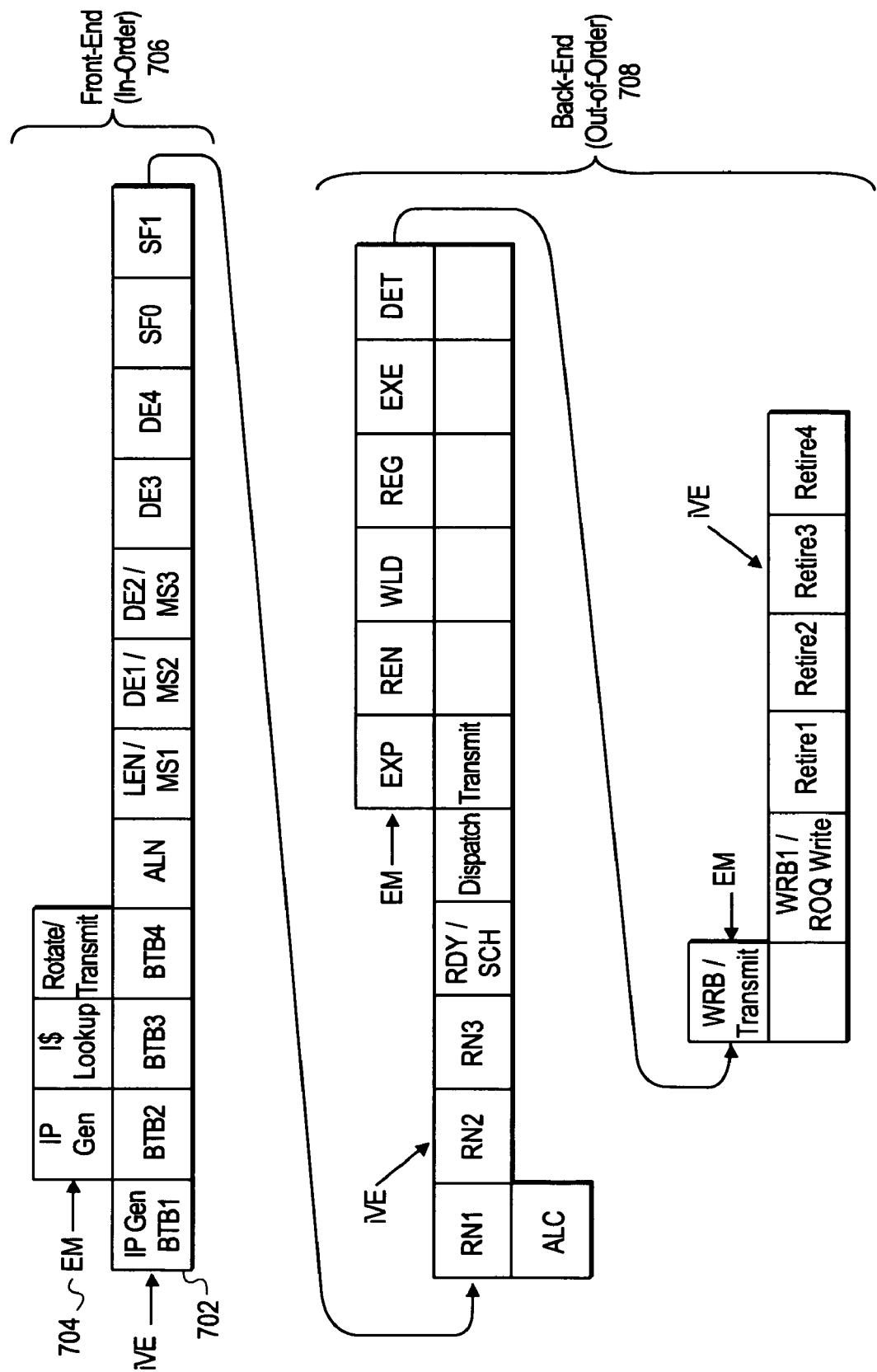
FIG. 7 illustrates a diagram illustrating an instruction pipeline for one embodiment of the out-of-order issue-engine.

FIG. 7 illustrates a diagram illustrating an exemplary basic organization of an instruction pipeline for one embodiment of the out-of-order issue-engine. The parts of out-of-order issue pipeline 702 and the execution engine pipeline 704 used for out-of-order issue-engine support are shown in FIG. 7. Various stages of the pipeline are grouped into what is referred to as the "front-end" 706 and "back-end" 708 portions of the machine. The front-end 706 of the machine performs the function of retrieving raw instruction bytes from instruction cache, and then decoding them into uops, which are also known as syllables. The front-end portion 706 of the out-of-order issue-engine pipeline 702 may be the in-order section of out-of-order issue-engine in FIG. 1, since the instructions are handled in the original program order up until completion of instruction decode and uop (syllable) generation.

Proceeding from left to right in FIG. 7 and FIG. 1, the front-end portion 706 of the pipeline begins with out-of-order issue-engine 20 issuing a line fetch request to instruction cache 32. The request is aligned on a 16-byte boundary, even though architectural instruction instruction-pointers are byte-aligned.

Branch prediction also takes place in the first four stages of the front-end pipeline 706. At the same time that a line fetch request is issued to execution engine 30, a branch target buffer (BTB) of the processor is consulted to determine if there is a known branch in the line being fetched. If a branch is present, it can be predicted.

Instruction cache 32 of execution engine 30 may be organized on, for example, a 32-byte line basis. Therefore, when the instruction bytes are returned to out-of-order issue-engine 20, either the upper or lower half of the line is selected before being transferred over signal lines 12. The line fetch request takes two clocks: one for instruction pointer generation and a second for instruction cache lookup. The lower or upper half is selected in a third clock cycle, shown as the Rotate/Transmit pipestage. All architectural instruction are byte aligned and can be between 1-15 bytes long.

Since the code parcels received from instruction cache 32 are 16-byte aligned, the iA instructions need to be extracted from these parcels before being decoded. This process is called instruction alignment/steering, and occurs in the ALN and LEN pipestages. Instructions are decoded in out-of-order issue-engine 20 at a rate of one instruction per clock. Decoding operations are shown occurring in the DE1-DE4 pipestages. At the end of the alignment (ALN) stage, a micro-ROM address is produced. This address starts a microcode sequence for the instruction currently being decoded. The microcode sequence is produced during the MS1-MS 3 pipestages.

Signal flight stages SF0-SF1 are not required for functionality, and merely represent an artifact of the large chip floorplan for one embodiment. These stages cover the time required for transmission of signals and information across physically distant sections of the chip. The back-end of the machine 708 receives an in-order stream of uops and re-orders them based on information such as input data dependencies, operation latency, and execution resource availability. These operations are executed out-of-order based on actual dependencies.

Renaming operations take place in rename stages RN1-RN3, as shown in FIG. 7. The renaming process utilizes a conventional register alias table and involves converting logical register identifiers into physical register identifiers. The out-of-order issue-engine 20 does not use a reservation station having tags for the producers of source operands. Instead, it expresses dependencies in terms of positions of operations in the reservation station. For this reason, at the end of the renaming operations, a dependency factor is produced for every uop dispatched. The dependency factor expresses all of the dependencies that the renamer has deemed necessary to be honored.

Instruction scheduling and dispatch is performed in the Ready/Schedule (RDY/SCH) and dispatch stages. Following renaming, pairs of uops are written into a structure which is the equivalent of a reservation station. This occurs at the end of the RN3 pipestage. The structure that the uops are written into comprises a dependency matrix and a uop waiting buffer. The uop waiting buffer is simply a holding structure where uops are held until they can be dispatched to execution engine execution pipeline 33.

Every set of four uops that is transmitted by out-of-order issue-engine 20 to execution engine 30 enters execution pipeline 33 starting at the WLD stage. Once in execution pipeline 33, the set of four uops proceeds in a lock/step manner. Execution of micro-operations is performed after sources have been read, followed by exception detection and write/back into the execution engine register file. The write/back (WRB) stage of the execution engine pipeline is also used to transmit execution status (i.e., exception information) back to out-of-order issue-engine 20.

Because the instruction execution status information is stored in a location that is a considerable physical distance away from out-of-order issue-engine 20, a WRB1 stage is needed to accommodate signal flight time. The execution status information is eventually recorded in re-order queue (ROQ) by the end of the same clock cycle. Retirement logic uses this information to update its data structures. It is appreciated that checks for exceptions and appropriate redirection is performed as part of the retirement process. For example, redirection of an exception may take up to three pipestages to complete.

Figure 8:
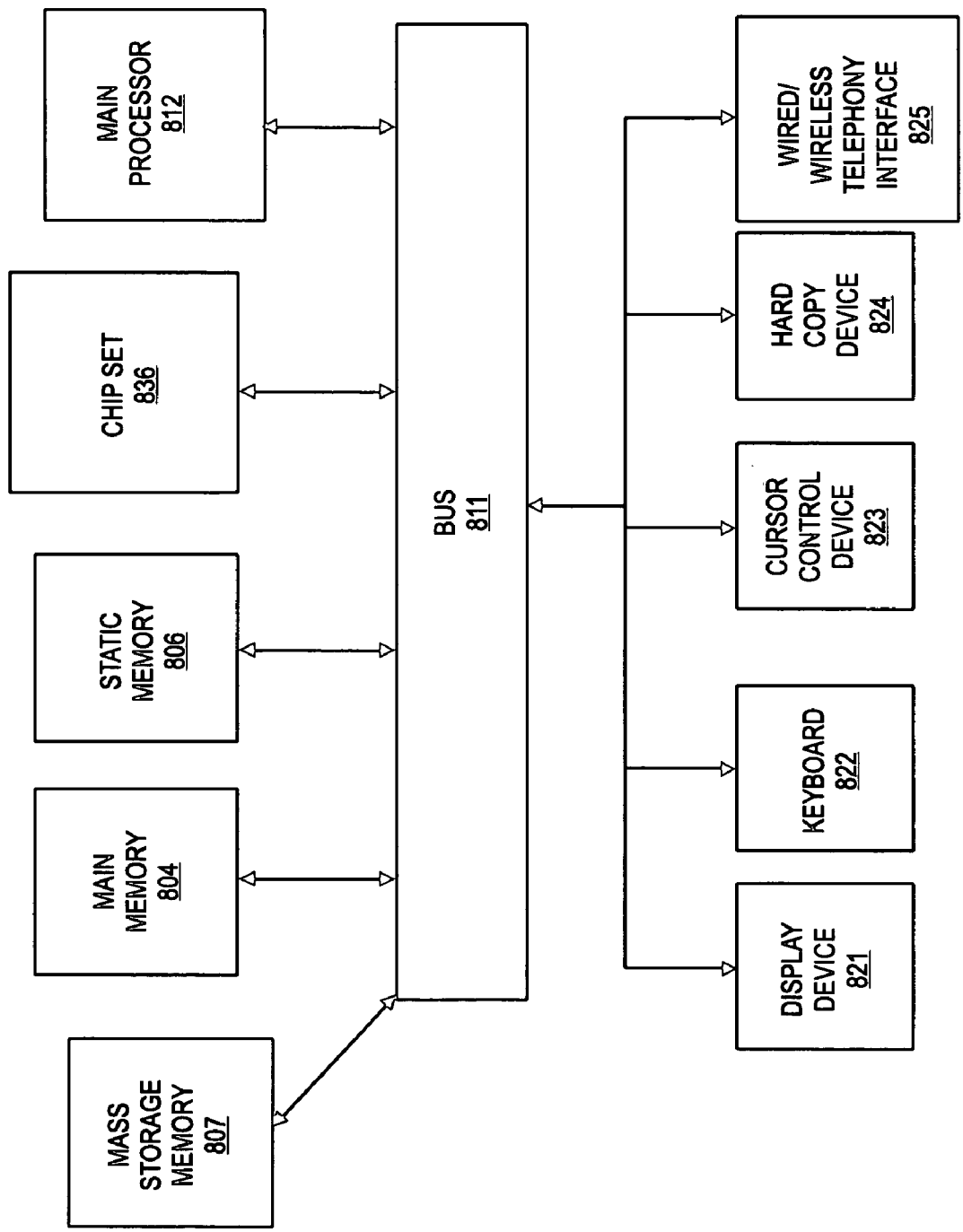
FIG. 8 illustrates a block diagram of an exemplary computer system that may use an embodiment of the processor.

FIG. 8 illustrates a block diagram of an exemplary computer system that may use an embodiment of the processor. In one embodiment, computer system 800 comprises a communication mechanism or bus 811 for communicating information, and an integrated circuit component such as a processor 812 coupled with bus 811 for processing information. One or more of the components or devices in the computer system 800 such as the main processor 812 or chipset 836 may use the processor and architectural ordering semantics described above.

Computer system 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812. In an embodiment, the Processor 812 may include a microprocessor, but is not limited to a microprocessor, such as a Pentium, PowerPC, etc.

Computer system 800 also comprises a read only memory (ROM) and/or other static storage device 806 coupled to bus 811 for storing static information and instructions for processor 812, and a mass storage memory 807, such as a magnetic disk or optical disk and its corresponding disk drive. Mass storage memory 807 is coupled to bus 811 for storing information and instructions.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. An apparatus, comprising:
an out of order issue engine that has a set of micro-operations that the out of order issue engine issues using:
speculative operations that can be issued whenever their operand data is available; and
architectural operations that issue after all earlier architectural operations in program order have been issued and all previous speculative operations associated with this architectural operation have issued, the architectural operations having a potential to fault or cause an exception, wherein a potentially excepting architectural operation is to issue with at least one speculative micro-operation, which generates data results speculatively, and at least one architectural micro-operation, which signals the faulting condition for the excepting operation, wherein a potentially excepting architectural operation is decomposed into a speculative micro-operation and an architectural micro-operation so that a STORE operation becomes an architectural operation and all previous faulting conditions may be guaranteed to have evaluated before the STORE is issued.

2. The apparatus of claim 1, further comprising an execution, wherein the out of order issue engine is further to decompose a potentially faulted instruction into the speculative operation and the architectural operation, wherein the speculative operation depends upon instruction operand data and then potentially sources to a dependent operation, and the architectural operation functions to deliver a fault indication of the potentially faulted instruction to the execute engine.

3. The apparatus of claim 2, wherein the architectural operation checks that a speculative load operation has been executed or retired prior to executing an issued store operation if an address of the speculatively issued load operation overlaps with an address of the store operation issued later in program order than the speculative load operation.

4. The apparatus of claim 1, wherein the processor further comprises a table which tracks all LOADs which have been speculatively advanced by execution of a first micro-operation, the table providing a signal when a LOAD/STORE conflict occurs in response to execution of a second micro-operation, the signal causing the execution engine to flush the execution pipeline.

5. The apparatus of claim 1, wherein the out of order issue engine to issue a check operation to allow a load operation to pass in execution order a store operation that has not resolved its address computation.

6. A computer system, comprising:
a processor having an out of order issue engine that has a set of micro-operations that the out of order issue engine issues using:
speculative operations that can be issued whenever their operand data is available;
architectural operations that issue after all earlier architectural operations in program order have been issued and all previous speculative operations associated with this architectural operation have issued, the architectural operations having a potential to fault or cause an exception, wherein each potentially excepting architectural operation is to issue with at least one speculative micro-operation, which generates data results speculatively, and at least one architectural micro-operation, which signals the faulting condition for the excepting operation, wherein a potentially excepting architectural operation is decomposed into a speculative micro-operation and an architectural micro-operation so that a STORE operation becomes an architectural operation and all previous faulting conditions may be guaranteed to have evaluated before the STORE is issued;
a data bus coupled to the processor; and
a memory coupled to the data bus.

7. The computer system of claim 6, wherein the out of order engine is further to decompose a potentially faulted instruction into the speculative operation and the architectural operation, wherein the speculative operation depends upon instruction operand data and then potentially sources to a dependent operation, and the architectural operation functions to deliver a fault indication of the potentially faulted instruction to the execute engine.

8. The computer system of claim 6, wherein the processor further comprises a table which tracks all LOADs which have been speculatively advanced by execution of a first micro-operation, the table providing a signal when a LOAD operation and STORE operation conflict occurs in response to execution of a second micro-operation, the signal causing the execution engine to flush the execution pipeline.

9. A method of operating a processor, comprising:
issuing a set of micro-operations using out of order issue engine and two different sets of architectural semantics by:
issuing speculative operations whenever their operand data is available;
issuing architectural operations after all earlier architectural operations in program order have been issued and all previous speculative operations associated with this architectural operation have issued, the architectural operation having a potential to fault or cause an exception; and
issuing at least one speculative micro-operation and at least one architectural micro-operation, the speculative micro-operation to generate data results speculatively, the architectural micro-operation to signal the faulting condition for the excepting operation, wherein a potentially excepting architectural operation is decomposed into a speculative micro-operation and an architectural micro-operation so that a STORE operation becomes an architectural operation and all previous faulting conditions may be guaranteed to have evaluated before the STORE is issued.

10. The method of claim 9, further comprising decomposing a potentially faulted instruction into the speculative operation and the architectural operation, wherein the speculative operation depends upon instruction operand data and then potentially sources to a dependent operation, and the architectural operation functions to deliver a fault indication of the potentially faulted instruction to an execute engine.

11. The method of claim 10, further comprising checking by the architectural operation that a speculative load operation has been executed or retired prior to executing an issued store operation if an address of the speculatively issued load operation overlaps with an address of the store operation issued earlier in program order than the speculative load operation.

* * * * *